United States Patent
Flender et al.

(10) Patent No.: US 10,449,640 B2
(45) Date of Patent: Oct. 22, 2019

(54) DEVICE FOR MOUNTING AT LEAST ONE FUNCTIONAL ELEMENT HAVING A CUT-OUT FOR A SHAFT

(71) Applicant: Mahle International GmbH, Stuttgart (DE)

(72) Inventors: Thomas Flender, Eberdingen (DE); Justus Himstedt, Stuttgart (DE); Michael Kreisig, Stuttgart (DE); Antonio Menonna, Ditzingen (DE); Ralf Rieger, Steinheim a.d. Murr (DE); Stefan Steichele, Gerlingen (DE)

(73) Assignee: Mahle International GmbH (DE)

( * ) Notice: Subject to any disclaimer, the term of this patent is extended or adjusted under 35 U.S.C. 154(b) by 195 days.

(21) Appl. No.: 14/849,319

(22) Filed: Sep. 9, 2015

(65) Prior Publication Data

US 2016/0067837 A1    Mar. 10, 2016

(30) Foreign Application Priority Data

Sep. 10, 2014   (DE) ........................ 10 2014 218 118

(51) Int. Cl.
| | | |
|---|---|---|
| *B23P 19/033* | (2006.01) | |
| *B23P 19/10* | (2006.01) | |

(Continued)

(52) U.S. Cl.
CPC .......... *B23P 11/025* (2013.01); *B23P 19/033* (2013.01); *B23P 19/107* (2013.01); *F01L 1/047* (2013.01);

(Continued)

(58) Field of Classification Search
CPC ......... B23P 19/02; B23P 19/033; B23P 19/07; B23P 19/022; B23P 19/107; B23P 2700/02
See application file for complete search history.

(56) References Cited

U.S. PATENT DOCUMENTS 3,224,086 A * 12/1965 Balamuth ............. B23P 19/033
227/131
4,065,687 A * 12/1977 Mishiro ................ B06B 1/0644
310/314

(Continued)

FOREIGN PATENT DOCUMENTS

DE           3812353 A1   11/1988
DE       102008032322 A1   4/2009

(Continued)

OTHER PUBLICATIONS

EP Search Report for App. EP 15177473 dated Jan. 27, 2016.

(Continued)

*Primary Examiner* — Christopher J Besler
(74) *Attorney, Agent, or Firm* — Fishman Stewart PLLC

(57) ABSTRACT

A device for mounting at least one receiving element on a shaft may include at least one holder for holding a receiving element having a cut-out for receiving a shaft. A moveable guide slide may be configured to move the shaft in a first direction through the cut-out in the receiving element. A tailstock may be configured to move counter to the first direction. The tailstock may include a tailstock tip configured to couple to an end face of the shaft. A vibration generator may be arranged in the tailstock for vibrating the shaft.

12 Claims, 2 Drawing Sheets

(51) Int. Cl.
*B23P 19/027* (2006.01)
*B23P 11/02* (2006.01)
*F01L 1/047* (2006.01)
*F16H 53/02* (2006.01)

(52) U.S. Cl.
CPC .......... *F16H 53/025* (2013.01); *B23P 19/027* (2013.01); *B23P 2700/02* (2013.01)

(56) References Cited

U.S. PATENT DOCUMENTS

| | | | | |
|---|---|---|---|---|
| 4,583,966 | A * | 4/1986 | Ocker ........................ | B06B 1/18 29/895.213 |
| 4,881,680 | A * | 11/1989 | Toelke ............... | B23K 37/0229 228/182 |
| 5,124,611 | A * | 6/1992 | Tamai .................... | H02N 2/106 310/317 |
| 5,687,473 | A * | 11/1997 | Tokura ................. | B21D 53/085 29/726.5 |
| 9,309,953 | B2 * | 4/2016 | Menonna ............. | F16H 25/08 |
| 2010/0139072 | A1 * | 6/2010 | Shinohara ............. | B23P 19/042 29/428 |
| 2013/0284392 | A1 * | 10/2013 | Idegomori ............... | B22D 1/00 164/71.1 |
| 2014/0245582 | A1 * | 9/2014 | Kim ........................ | B23P 11/00 29/240 |

FOREIGN PATENT DOCUMENTS

| | | |
|---|---|---|
| DE | 102008064194 A1 | 7/2010 |
| DE | 102009029797 A1 | 12/2010 |
| DE | 102010055139 A1 | 6/2012 |
| DE | 102012211327 A1 | 1/2014 |
| JP | S6328526 A | 2/1988 |
| JP | 2000-073709 A | 3/2000 |
| SU | 867592 A1 | 9/1981 |
| WO | WO-2013048166 A2 | 4/2013 |

OTHER PUBLICATIONS

Document XP002752946, Database WPI, Week 198229, Thomson Scientific, London, GB; AN 1982-J7620E.
English Abstract for JPS6328526A.
English Abstract for JP2000073709A.
English Abstract for DE102012211327A1.
Bibliographic Data Sheet indicating No Abstract Available for SU867592-A1.
English abstract for DE-102008032322.
English abstract for DE-102009029797.
English abstract for DE-102010055139.
English abstract for DE-102008064194.
German Search Report for DE-102014218118.6, dated Jul. 22, 2015.

* cited by examiner

DEVICE FOR MOUNTING AT LEAST ONE FUNCTIONAL ELEMENT HAVING A CUT-OUT FOR A SHAFT

CROSS-REFERENCE TO RELATED APPLICATIONS

This application claims priority to German Patent Application No. 10 2014 218 118.6, filed Sep. 10, 2014, the contents of which are hereby incorporated by reference in its entirety.

TECHNICAL FIELD

The present invention relates to a device for mounting at least one functional element having a cut-out for a shaft. The invention also relates to a method for joining at least one functional element having a cut-out to a shaft.

BACKGROUND

To join functional elements, in particular cams, to a shaft, in particular to a camshaft tube, the hubs or cut-outs in the individual functional elements must be aligned with the axis of the shaft. If one or a plurality of functional elements is to be joined in one go by introducing the shaft, all the functional elements must be aligned accordingly.

DE 10 2008 064 194 A1 discloses a device suitable for this, for positioning a plurality of functional elements, in particular cams, having a cut-out for a shaft in a predefined angle position on the shaft, the device having a plurality of holders each intended for one functional element. The holders can be positioned in such a manner that the cut-outs in the functional elements lie substantially in a common straight line.

When a cam or a plurality of cams at once are mounted on a shaft, the cam to be mounted is usually grasped with a gripper or held in a holder and heated, and then the camshaft tube or generally a shaft is introduced until the at least one cam has reached its end position. So that the camshaft tube or generally the shaft can be supported when being passed through the cam or generally the functional element, a tailstock having a tailstock tip first passes through the functional element from the opposite side and picks up the shaft or specifically the camshaft tube. Then the tailstock passes back through the cut-outs in the functional elements together with the shaft. The functional elements or specifically the cams are already positioned sufficiently precisely for at least the tailstock tip, which has a smaller diameter than the shaft, to pass through the cut-outs without problems. Incorrectly positioned functional elements can thereby be aligned at least roughly in advance with the tailstock head. The prior correction of coaxial errors is then continued while the shaft is passed through by means of the insertion bevel on the shaft tube and the functional elements are thereby threaded onto the shaft.

While the shaft is passing through, however, the functional element to be threaded on can come into contact with the shaft in part-regions of the hub of the functional element and brief fretting or chip formation can occur as a result. In addition, there can be a risk that the functional element is misaligned in the gripper itself and cools in this misaligned position when in its end position, resulting in a positional defect.

SUMMARY

The present invention is therefore concerned with the problem of specifying a device for mounting at least one functional element having a cut-out for a shaft, which overcomes the disadvantages known from the prior art.

This problem is solved according to the invention by the subject matter of the independent claims. Advantageous embodiments form the subject matter of the dependent claims.

The present invention is based on the general concept of providing a vibration generator in a device for mounting on a shaft at least one functional element having a cut-out for the shaft, and providing said vibration generator in particular in a tailstock tip or generally in a tailstock, and activating said vibration generator when joining to the at least one functional element, as a result of which an "adhesion" of the functional element to the shaft is prevented by constant, minimal shaking and in particular the contact forces can be reduced. It is in particular possible thereby to exclude the catching or tilting of the functional element responsible for subsequent misalignment of the functional element. This is particularly advantageous when more than one functional element is passed through, because when there are several functional elements to pass through, the first functional element passed through, for example the first cam passed through, is already cooled and thus the clearance available for passing through becomes increasingly smaller and thus also the risk of catching is increased. The vibration and the forces produced thereby are of course smaller than the gripper force in grippers with which the cam or functional element is gripped or held. The device according to the invention has at least one holder or gripper, each intended for one functional element, which in the case of a plurality of holders are preferably arranged even vertically one above the other, and a movable guide slide, by means of which the shaft can be pushed in a first direction through the cut-outs in the functional elements. The above-mentioned tailstock can be moved counter to the first direction and thus counter to the shaft and guide slide and at the same time can be coupled with its tailstock tip to an end face of the shaft. The vibration generator is then preferably arranged in the tailstock tip and generates the vibrations necessary for improved mounting. With the device according to the invention, catching or tilting of the functional elements to be mounted and in particular misaligned fixing of same on the shaft can thus preferably be completely excluded, as a result of which particularly high manufacturing quality can be produced.

So that the vibrations can improve mounting particularly advantageously, the shaft must be designed to be sufficiently elastic for a minimal deflection to take place or the holders or grippers must allow the at least one functional element to move. This moving preferably takes place in a restricted manner on one plane (x-y) so that the axial position (z axis) of the functional element on the shaft is not affected.

In an advantageous development of the solution according to the invention, the tailstock tip has a bevel, by means of which the tailstock tip can be inserted at least partially into the shaft. This bevel can be used to pre-align the individual functional elements gripped in the respective grippers or held in the respective holders, in particular if the cut-outs of said functional elements are not arranged flush with each other. The end bevel can also be used to achieve a vibration-transmitting coupling to the shaft by pressing the tailstock tip against the end face of the shaft and partially inserting it into the latter. The vibration-transmitting coupling is particularly important for the mounting process according to the invention.

The vibration generator can expediently be switched on and off. This makes it possible to use the vibration generation according to the invention only temporarily, for example for accelerated cooling of a thermally joined camshaft, so that for example vibrations can be applied with the vibration generator to a camshaft tube after the latter has reached its end position, and the camshaft tube as a result vibrates and undergoes greater micro-contact with the hub of the functional element or the hub of the cam, as a result of which faster cooling can be effected. Cycle times can in particular be reduced thereby. It is also conceivable to activate the vibration generation only temporarily in one or more sections while the shaft passes through the functional elements.

In a further advantageous embodiment of the solution according to the invention, the frequency and amplitude of the vibrations generated by the vibration generator can be adjusted. If, for example, only individual functional elements, in particular cams, are joined, or if the shaft is already in its end position when a plurality of functional elements is joined, the amplitude and/or frequency can be increased in order to bring the camshaft tube into greater micro-contact with the hub of the functional element and thus effect faster cooling. The first amplitude and/or first frequency can thus be provided for the normal mounting process and can then be increased for faster cooling in the end phase.

In a further advantageous embodiment of the solution according to the invention, the vibration generator has an eccentric, which is driven hydraulically, electrically or pneumatically. Such an eccentric can for example be an electric motor with an unbalanced mass, which is arranged in the tailstock tip. The electrical energy can simply be supplied via the tailstock itself. In the same manner, the eccentric can of course also be driven pneumatically or hydraulically.

The present invention is further based on the general concept of improving a method for thermally joining at least one functional element having a cut-out, for example cams, balancing weights, gears and/or bearings, to a shaft by using the device described in the paragraphs above. In the method according to the invention, the functional element is thus first placed into a gripper/holder of the device and then or previously heated.

The tailstock is then passed from below through the cut-out in the at least one individual functional element, as a result of which the functional element, if not yet aligned, can be aligned flush in terms of its cut-out. If a plurality of functional elements is present, the tailstock is passed through all the cut-outs in all the functional elements until it can be coupled with its tailstock tip at the end of the shaft held in the guide slide. If the coupling is effected, the vibration generator is activated and then the shaft is pushed by means of the movable guide slide from above through the cut-outs in the functional elements. During the pushing through process, the vibration generator continuously generates vibrations, which prevent in particular "adhesion" of the functional elements, for example cams, and at least reduce contact forces between the functional elements and the shaft by constant, minimal shaking An extremely high-quality manufacturing process with extremely high-quality end products can in particular be achieved thereby. With a shaft of stepped diameter, with a diameter that is set back in some sections, it is also conceivable to activate the vibration generation only temporarily when passing through a section of larger diameter.

The frequency and/or amplitude of the vibrations generated by the vibration generator are expediently increased as soon as the shaft has reached its end position. Increasing the frequency and/or amplitude achieves a greater contact between the hub of the functional element and the shaft, as a result of which faster cooling and thus a reduction in the cycle time can be achieved.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
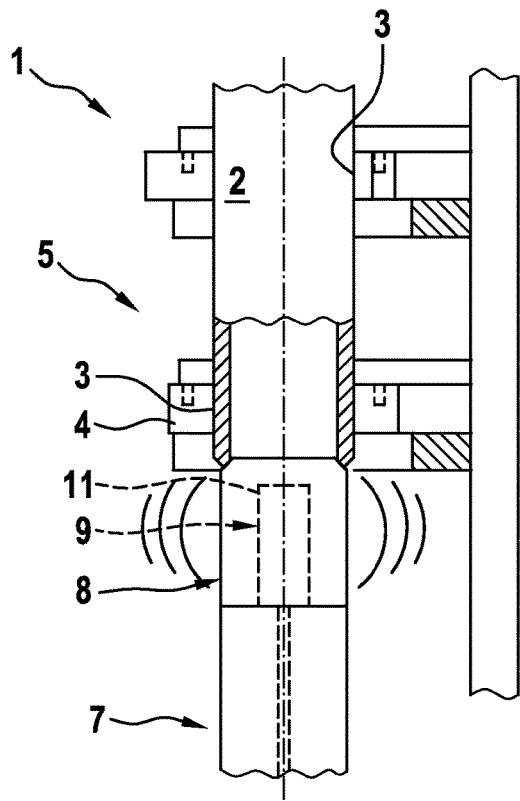
FIG. 1 schematically shows a partially cut away diagram of a device according to the invention for mounting a plurality of functional elements having a cut-out for a shaft, FIG. 2 schematically shows a diagram as in FIG. 1, but with a differently formed tailstock, FIG. 3 schematically shows a diagram as in FIG. 2, but with a differently formed tailstock and a differently formed tailstock tip, FIG. 4 schematically shows a diagram as in FIG. 1, but with holding bars.
Figure 2:
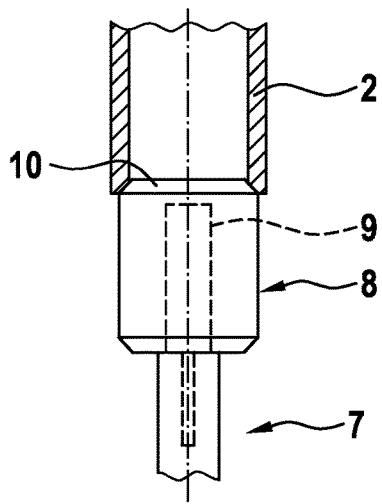
Figure 3:
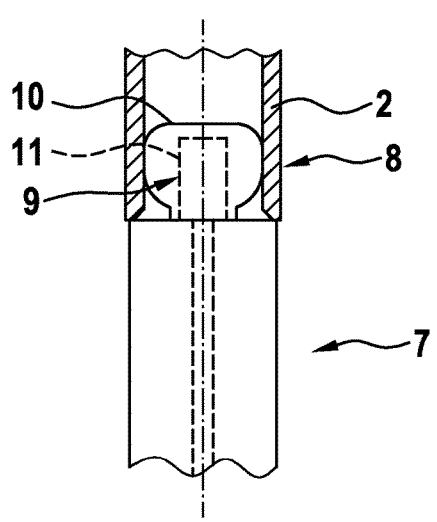
Figure 4:
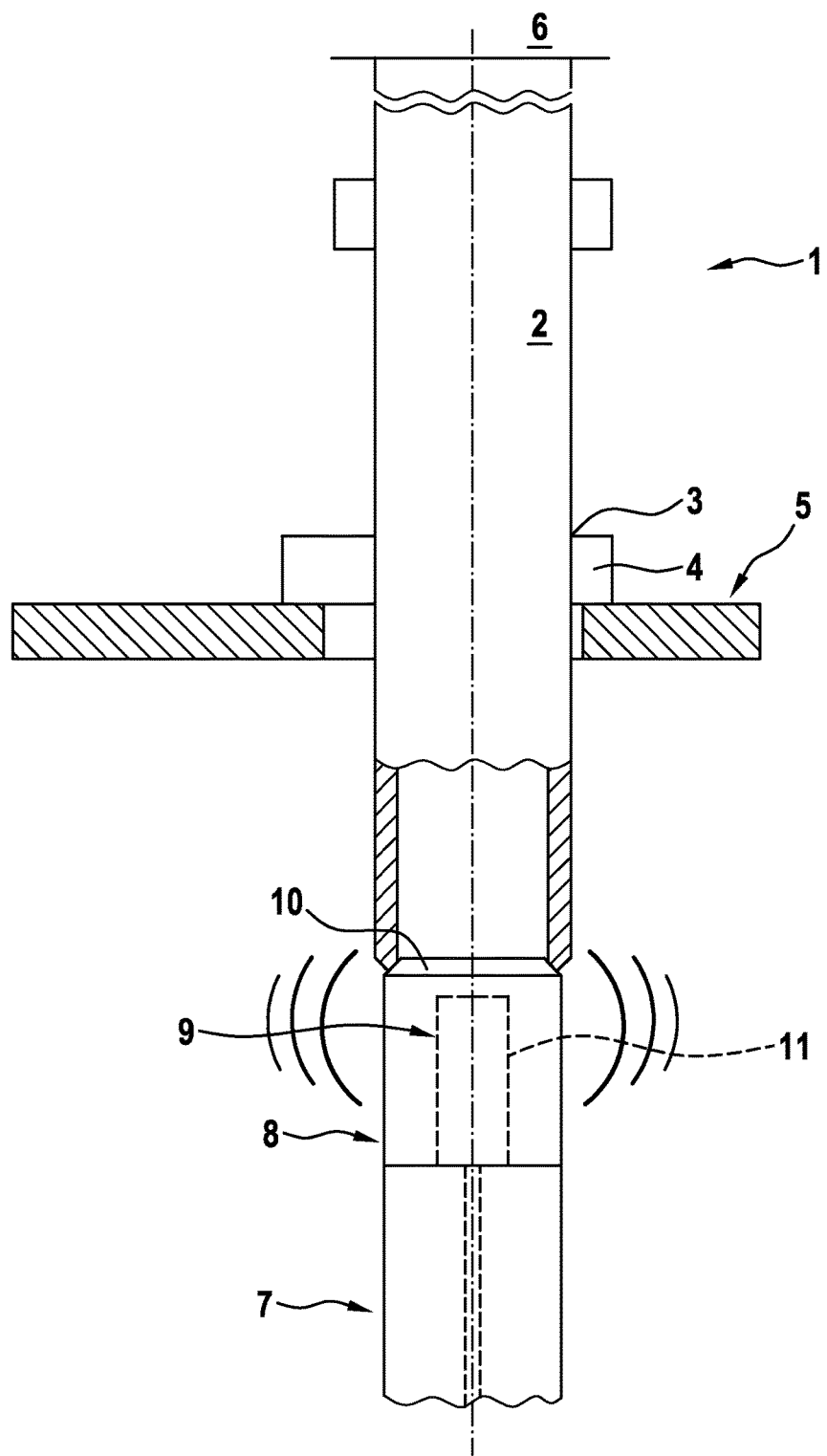

According to FIGS. 1 and 4, a device 1 according to the invention for mounting a plurality of functional elements 4 having a cut-out 3 for a shaft 2, for example cams, balancing weights, gears and/or bearing, on the shaft 2 has a plurality of holders 5, by means of each of which one functional element 4 can be held. The holders 5 can for example be formed as grippers, which hold the respective functional element 4 in a force-fitting manner, as is shown for example in FIG. 1, but also merely as a holding bar, as is shown for example in FIG. 4. Furthermore, a movable guide slide 6 is provided, by means of which the shaft 2 can be pushed in a first direction, in this case from above, through the cut-outs 3 in the functional elements 4. Furthermore, a tailstock 7 is provided, which can be moved counter to the first direction, i.e. in the present case upwards, and the tailstock tip 8 of which can be coupled to an end face of the shaft 2. According to the invention, a vibration generator 9 is then provided, which is arranged in the tailstock 7 and in particular in the tailstock tip 8 and by means of which the tailstock tip 8 and furthermore also the shaft 2 can be set in vibration.

The shaft 2 is usually formed as a camshaft tube, whereas the functional elements 4 are usually formed as cams, thermal joining taking place between shaft 2 and functional elements 4. Alternatively thereto, the shaft 2 can of course also be connected to the functional elements 4 by a press fit.

If the tailstock tip 8 according to FIGS. 1 to 4 is viewed, an end bevel 10 can be seen thereon, by means of which the tailstock tip 8 can be inserted at least partially into the shaft 2 and at the same time can be coupled to said shaft in a vibration-transmitting manner. The vibration generator 9 itself is formed such that it can be switched on and off and also such that the vibrations generated by it can be adjusted in terms of their frequency and/or amplitude. In principle, the device can of course also be used for only a single functional element 4. The holders 5 intended for the at least one functional element 4 can furthermore be displaceable, in particular in a plane lying orthogonally to the axis of the shaft 2.

As already described above, the guide slides 6 and with these the shaft 2 can be inserted vertically from above and the tailstock 7 can be inserted vertically from below into the functional elements 4, which are held vertically one above the other in the holders 5, it being particularly advantageous to insert the shaft 2 vertically from above because said shaft is in this case aligned by gravity itself An outer diameter of the tailstock 7 and of the tailstock tip 8 is smaller than an inner diameter of the cut-outs 3 in the functional elements 4, so that said tailstock and tailstock tip can be pushed in a preferably contact-free manner through the cut-outs 3. Just pushing through the tailstock 7 can be used to pre-align the individual functional elements 4 when functional elements 4 are greatly displaced in terms of their alignment.

The vibration generator 9 has an eccentric 11, which is in particular driven hydraulically, pneumatically or preferably by an electric motor.

With the device 1 according to the invention, it is possible for the first time, when joining functional elements 4 to a shaft 2, to prevent, or at least to reduce, adhesion of the functional elements 4, since the contact forces are at least reduced by the constant, minimal shaking At the same time, catching or tilting of the functional elements 4 can also be prevented. This is particularly advantageous when more than one functional element 4 is passed through, because when there are several functional elements 4 to pass through, the first functional element 4 passed through is already cooled and thus the clearance available for passing through becomes increasingly smaller and thus also the risk of catching is increased. The vibrations generated by the vibration generator 9 and the forces occurring as a result are of course always smaller than the gripper force in the gripper or holder 5, so the position of the functional elements 4, which are in particular gripped in the gripper, is not adversely affected.

The vibrations can be used while the tailstock tip 8 is being moved up and thus make a first correction of a coaxial error possible. The possibility of switching the vibration generator 9 on and off also makes it conceivable to switch on the vibration only when the shaft end passes through an associated functional element 4 and thus to thread on the functional element 4, for example the cam, correctly. If only a single cam or functional element 4 is joined, or if the shaft 2 is in its end position when a plurality of functional elements 4 are joined, the amplitude and/or frequency of the vibrations generated by the vibration generator 9 can be increased in order to bringer the shaft 2 into greater microcontact with the hub of the functional element 4 and thus effect faster cooling, as a result of which the cycle time can be reduced.

In the exemplary embodiment shown, the vibration generator 9 is in the tailstock tip 8, it of course being possible for the tailstock tip 8 itself to be placed onto and removed from the tailstock 7, so one and the same vibration generator 9 can be placed onto a wide variety of tailstocks 7.

With the device 1 according to the invention and in particular also with the method according to the invention, in which the shaft 2 is set in vibration by means of the vibration generator 9 when the functional elements 4 are joined to the shaft 2, particularly high-quality joining with at the same time a reduced cycle time can be achieved.

The invention claimed is:

1. A device for mounting at least one receiving element on a shaft, comprising:
   at least one holder for holding a receiving element, wherein the receiving element includes a cut-out for receiving the shaft;
   a movable guide slide configured to move the shaft in a first direction through the cut-out in the receiving element;
   a tailstock configured to move counter to the first direction, the tailstock including a to stock tip configured to couple to an end face of the shaft, the tailstock tip including an end bevel structured and arranged to couple the tailstock tip to the end face of the shaft when at least part of the end bevel is inserted within the shaft;
   a vibration generator arranged within an interior cavity of the tailstock for vibrating the shaft and extending at least partially within the tailstock tip;
   wherein the vibration generator is at least partially arranged in the tailstock tip adjacent to the end lever; and
   wherein the vibration generator includes a driven eccentric.

2. The device according to claim 1, wherein the at least one holder is displaceable in a plane extending transverse to an axis of the shaft.

3. The device according to claim 1, wherein the end bevel has a cross-sectional area smaller than the cut-out in the receiving element such that the receiving element is alignable within the at least one holder when at least part of the end bevel is inserted within the cut-out.

4. The device according to claim 1, wherein at least one of:
   the vibration generator is configured to be switched on and off, and
   the vibration generator is adjustable to vary at least one of a frequency of vibrations and an amplitude of vibrations.

5. The device according to claim 1, wherein the at least one holder includes a plurality of holders arranged axially spaced apart relative to an axis of the shaft and each configured to hold a respective receiving element, and wherein the tailstock together with the vibration generator arranged therein are axially movable counter to the first direction and pass through the plurality of holders to facilitate aligning the respective receiving elements.

6. The device according to claim 1, wherein the guide slide is configured to move linearly in the first direction towards the tailstock to push the shaft through the cut-out of the receiving element and the tailstock is configured to move linearly counter to the first direction towards the guide slide into the cut-out of the receiving element held by the at least one holder, and wherein the tailstock couples to the end face of the shaft via the tailstock tip.

7. The device according to claim 1, wherein an outer diameter of the tailstock including the tailstock tip is smaller than an inner diameter of the cut-out in the receiving element.

8. The device according to claim 1, wherein the eccentric is driven at least one of hydraulically, electrically, and pneumatically.

9. The device according to claim 1, wherein the receiving element includes at least one of a cam, a balancing weight, a gear and a bearing.

10. The device according to claim 1, wherein the tailstock tip is an elongated tubular portion of the tailstock.

11. The device according to claim 1, wherein the interior cavity of the tailstock extends into the tailstock tip and defines an interior cavity of the tailstock tip, the vibration generator arranged within the interior cavity of the tailstock tip.

12. The device according to claim 8, wherein the eccentric is an electric motor with an unbalanced mass.

* * * * *